UNITED STATES PATENT OFFICE.

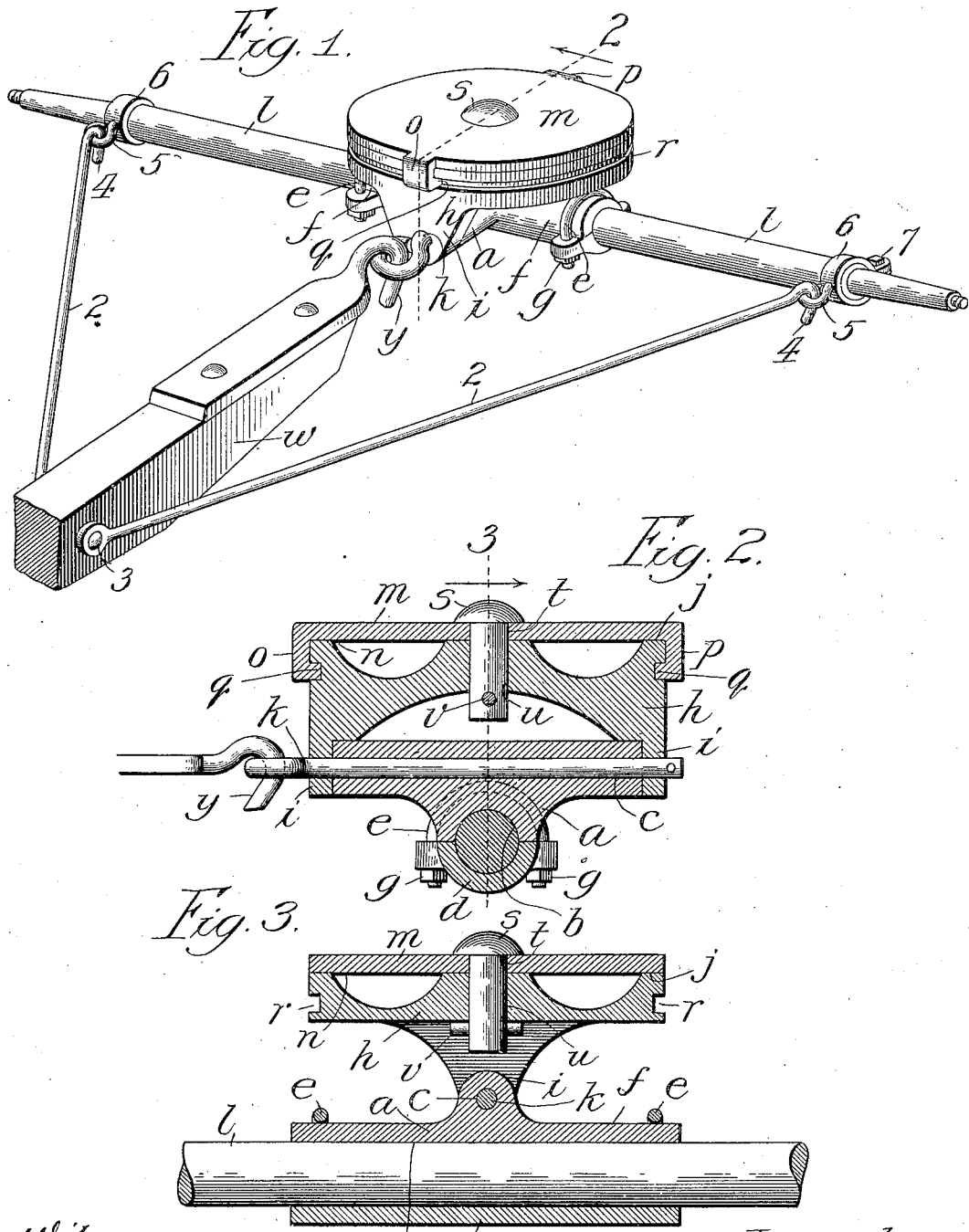

JOHN H. JESSEN, OF RENSSELAER, INDIANA.

FIFTH-WHEEL FOR VEHICLES.

No. 836,767.  Specification of Letters Patent.  Patented Nov. 27, 1906.

Application filed April 24, 1905. Renewed June 21, 1906. Serial No. 322,701.

*To all whom it may concern:*

Be it known that I, JOHN H. JESSEN, a citizen of the United States, residing in Rensselaer, in the county of Jasper and State of Indiana, have invented certain new and useful Improvements in Fifth-Wheels for Vehicles, of which the following is a specification.

My invention relates to that class of fifth-wheels having a top member or plate and a pivotally-mounted member upon which such top plate is rotatably mounted.

The principal object of my invention is to provide a simple, economical, and efficient fifth-wheel for vehicles.
A further object of the invention is to provide a fifth-wheel for vehicles adapted to permit the vertical movement of the opposite ends of the axle without materially affecting the horizontal position of the bolster-box or of the parts of the fifth-wheel which are connected with the framework of the vehicle and without interfering with the rotation of the top plate and supporting members of such wheel with relation to each other.
A further object of the invention is to provide a fifth-wheel having a top member secured to a pivoted supporting member by means of lugs arranged in alinement with the longitudinal center of the bed or framework of the vehicle and with means for enabling the tongue to be secured to one of such fifth-wheel members, whereby the stresses of pulling the load may be sustained by such wheel and framework to relieve the front axle of such stresses to as great an extent as possible.

Other and further objects of the invention will appear from an examination of the drawings and the following description and claims.

In the accompanying drawings, Figure 1 is a perspective view of a fifth-wheel constructed in accordance with my improvements, showing it secured to an axle and the tongue removably secured to such wheel; Fig. 2, a longitudinal central elevation in section, taken on line 2 of Fig. 1 looking in the direction of the arrow; and Fig. 3 a central sectional elevation taken on line 3 of Fig. 2 looking in the direction of the arrow.

In the art to which this invention relates it is very desirable to provide means whereby the opposite ends of the front axle may have as great freedom of play vertically as possible without interfering with the horizontal position of the bed or framework of the vehicle, and whereby the pulling strains may be sustained by the fifth-wheel and the framework of the vehicle without subjecting the front axle to such strains except to the extent necessary for guiding the vehicle. It is also desirable to so connect the tongue with the fifth-wheel and axle, respectively, that it may be readily removed, if desired, and will nevertheless be prevented from becoming disconnected accidentally while in use.

In constructing a fifth-wheel for vehicles in accordance with my improvements and adapted to accomplish the above-described objects I provide a metallic bottom member $a$ in the form, preferably, of a malleable casting or bracket having a concave portion $b$ for engaging the axle and a perforation $c$ extending through such bottom bracket member horizontally at right angles to the axle. A plurality of securing-clips $d$ extend beneath and across the under side of the axle $l$ and are each provided with perforations in their opposite ends for receiving U bolts $e$, one of which extends over each transversely-extending end portion $f$ of the perforated bracket or bottom member, being secured to the securing-clips by means of nuts $g$.

A perforated metallic supporting member $h$, having depending lugs $i$ and an upper supporting bearing-surface $j$, is pivotally secured to the bottom casting or bracket by means of a pivot-pin $k$ in the form of an eyebolt, which extends horizontally through the perforated lug portions of such pivoted member at right angles to the axle $l$, so as to permit the independent vertical movement of the opposite ends of the axle without affecting the horizontal position of the fifth-wheel or the main frame or box of the vehicle supported thereby. A top plate $m$ is mounted upon this pivoted supporting member $h$ and has a horizontal bottom bearing-surface $n$ in engagement with the supporting bearing-surface of the pivoted supporting member, and depending lugs $o$ and $p$, preferably integral with the top plate, extend downward outside of the pivoted supporting member and have inwardly-projecting shoulders $q$ in engagement with an annular peripheral slot $r$ in such pivoted supporting member.

A headed king-bolt $s$ extends through a central perforation $t$ in the top plate and through a central perforation $u$ in the perforated supporting member. This bolt may be secured in place by means of a cotter-pin $v$ in its lower end, so as to permit the rotation of the top plate and pivoted supporting member with relation to each other.

A tongue $w$ is provided, having a hook $y$ with its lower end portion extending through the opening in the eyebolt $k$, the lower portion of such hook extending downward and forward at an incline beneath the engaged portion of the eyebolt a sufficient distance, as shown in Fig. 2, to prevent the removal of the hook while the tongue is in horizontal or raised position and the upper portion of such hook being rearward from the lower end thereof above the eyebolt and adapted to engage the side of the pivoted supporting member of the fifth-wheel, so as to prevent the removal of the tongue until its front end is first lowered to substantially the level of the bottom of the supporting-wheels. (Not shown.)

Transverse braces 2 have their front ends secured to the tongue by means of a bolt 3 or in any ordinary and well-known manner and extend backward and outward at an incline in the direction of the outer end portions of the axle, to which they are secured by means of hook portions 4 and eyebolts 5, the eyebolts being secured to the axle preferably by means of open metallic rings 6, which are held in place by means of bolts 7. The hook portion of each of these rods 2 extends downward and forward at an incline in a similar manner to the main tongue-hook already described, so that they cannot be removed or displaced while the tongue is in raised position, but may be readily removed when the end of the tongue is lowered.

By this arrangement it will be seen that the greatest possible freedom of vertical movement of the opposite ends of the axle is permitted, without affecting the horizontal or normal position of either the top plate or the pivoted supporting member of the fifth-wheel. The rotation of such members of the fifth-wheel is therefore not interfered with by the relative vertical positions of the opposite ends of the axle. No matter what position the front axle may assume, the top and supporting members of the fifth-wheel are not caused to bind, but are free to rotate in a substantially horizontal plane, or, in other words, in the same plane or a plane parallel with the rear axle. The advantage of this arrangement will be readily seen and appreciated by those skilled in the art, and it will also be noted that the tongue being connected directly to the fifth-wheel relieves the axle of practically all of the pulling strains. The arrangement of the lugs in the top plate of the fifth-wheel in line with the longitudinal center of the vehicle, as already described, greatly strengthens the connection between the top and pivoted supporting member of such wheel and permits the lugs to be always in alinement with the forward pulling strains.

I claim—

1. In a fifth-wheel for vehicles, the combination of a supporting member adapted to be secured to the axle of a vehicle and having longitudinally-perforated arms extending forward and back of the axle, an intermediate member having an upper bearing-surface and having depending perforated lugs at its outer edge pivotally connected with the arm portions of the supporting member, and an upper member mounted upon the upper bearing-surface portion of such pivotally-mounted intermediate member rotatable in a horizontal plane and provided with means for rotatably securing it to such pivoted member.

2. In a fifth-wheel for vehicles, the combination of a supporting member adapted to be secured to the axle of a vehicle and provided with a perforation extending horizontally therethrough, an intermediate member provided with perforations in alinement with the perforation in such supporting member, a supporting-pivot extending through such perforations and pivotally supporting such intermediate member adapted to permit it to swing in a vertical plane, and an upper member mounted upon such pivoted intermediate member rotatable in a horizontal plane and a tongue attached to the supporting-pivot and thereby connected with the fifth-wheel mechanism.

3. In a fifth-wheel for vehicles, the combination of a supporting member adapted to be attached to the axle of a vehicle, a fifth-wheel member, a pivot-pin extending transversely to the axle pivotally supporting such fifth-wheel member and connecting it with such supporting member, a member rotatably mounted in engagement with such pivoted member, and a tongue removably secured to such pin and thereby connected with the pivoted member of the fifth-wheel.

4. In a fifth-wheel for vehicles, the combination of a pivotally-mounted member having a bearing-surface, a member mounted in engagement with such bearing-surface portion of the pivoted member and rotatable in a plane parallel with the pivoted points of such pivoted member, means for connecting one of such members with the axle of the vehicle, and a tongue provided with a hook removably connected with one of such fifth-wheel members and having hook mechanism adapted to be removably connected with the axle.

5. In a fifth-wheel for vehicles, the combination of a supporting member adapted to be attached to the axle of a vehicle, a fifth-wheel member, a pivot-pin extending transversely to the axle pivotally supporting such fifth-wheel member and connecting it with such supporting member and provided with an eye in the front end, a top member rotatably mounted in engagement with such pivoted member, and a tongue provided with a hook extending through such eye and having a lower end portion extending forward beneath the end portion of the pin and an upper portion back of such lower hook portion adapted to engage the fifth-wheel member when the tongue is in raised position and prevent the removal of the hook and adapted to permit the removal of the hook when the tongue is in lowered position.

JOHN H. JESSEN.

Witnesses:
　HARRY I. CROMER,
　NORMAN A. STREET.